May 24, 1966     W. T. GRANQUIST     3,252,757
SYNTHETIC SILICATE MINERALS
Filed July 27, 1962
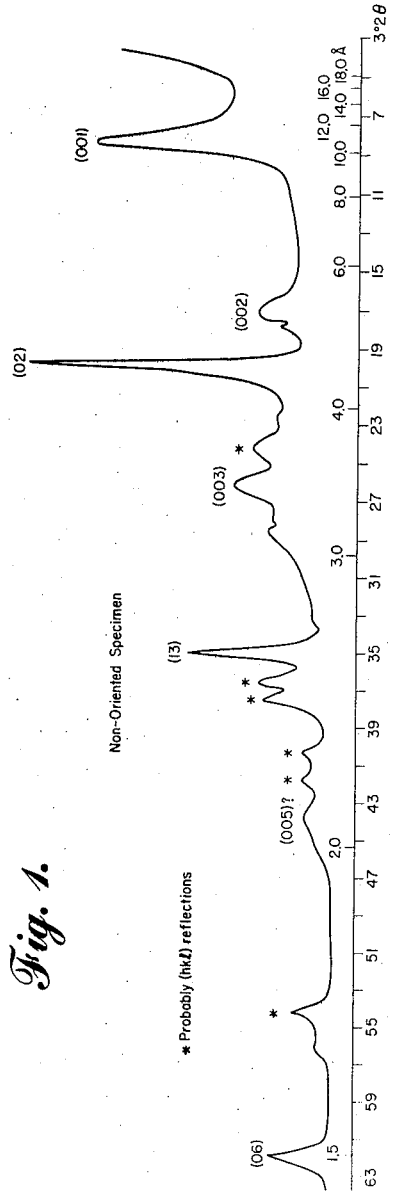
Fig. 1.
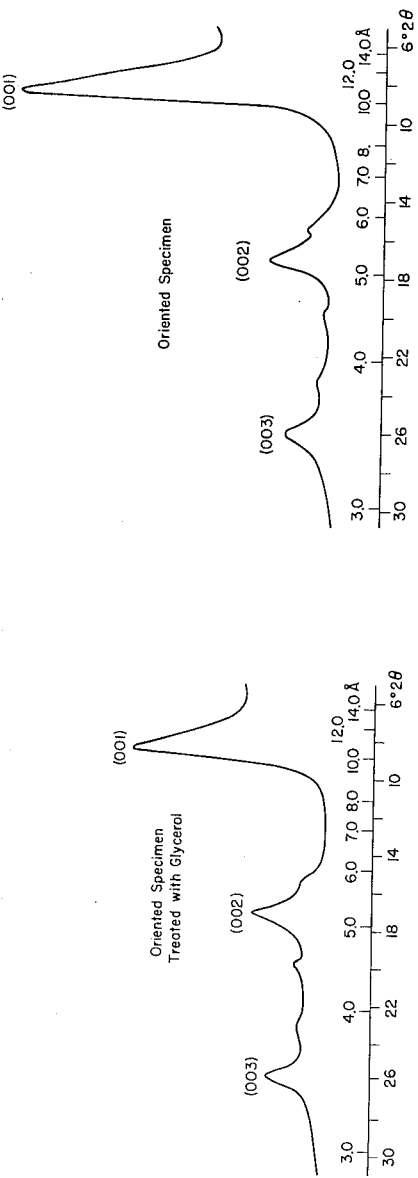
Fig. 2.
Fig. 3.
Inventor
WILLIAM T. GRANQUIST
by Delman H. Larson
Agent

United States Patent Office 3,252,757
Patented May 24, 1966

3,252,757
SYNTHETIC SILICATE MINERALS
William T. Granquist, Marshall Township, Allegheny County, Pa., assignor to National Lead Company, New York, N.Y., a corporation of New Jersey
Filed July 27, 1962, Ser. No. 212,829
10 Claims. (Cl. 23—111)

This invention relates to synthetic silicate minerals, and in particular to the hydrothermal production of novel layer-type silicates.

As is well-known, there occur in nature a very large number of silicate minerals, and it has been only in recent years that the structure of these has been elucidated. Even at the present time the structures of many silicates are not known exactly, which is a consequence of the highly varied fashion in which silicates may be built up, and of the existence of isomorphous substitutions within a given group of silicate minerals. It may be stated as a general proposition that silicates may be broadly divided into four groups according to crystal structure, these being massive silicates with bonds more or less equally strong in three dimensions, giving rise to isodimensional particles; layer-type silicates in which the bonds are strong in two dimensions but relatively weak in the third, giving rise to layer-like micaceous structures; needle-like or acicular type silicates, in which the bonds are predominantly strong in one dimension but relatively weak in the other two; and finally those silicates in which the crystal structure is so poorly developed that they may be classified as amorphous. The present invention concerns certain novel layer-type clay-like silicates, which I produce by a hydrothermal process. The products made in accordance with my invention have great utility. They include products useful as cracking catalysts, as drilling mud additives, as mineral carriers for insecticides, as carriers for organic compounds and trace elements for plant and animal nutrition, as foundry sand binders, as a base for lake pigments, and as dehydrating agents and the line, as will be more fully described hereinbelow.

It may be stated that most methods of synthesis of silicate minerals fall into two broad groups: melting processes and hydrothermal processes. In the former, quite high temperatures are required as the entire silicate mineral is crystallized from a melt. In hydrothermal processes the formation of the desired mineral takes place in the presence of a considerable excess of water, which is generally heated to some suitable temperature and maintained in a liquid state, although in its broadest sense this process includes crystallizations taking place from aqueous systems at ambient temperature and pressure.

An object of the present invention is to provide a novel group of layer-type silicates, and a novel process for producing them.

Another object of the invention is to provide a novel hydrocarbon cracking catalyst and of very good catalyst behavior.

A further object of the invention is to provide novel layer silicates of great usefulness as adsorbents, carriers and the like, as well as a novel process for producing these.

Other objects of the invention will become apparent as the description thereof proceeds.

Generally speaking, and in accordance with an illustrative embodiment of my invention, I put into a water suspension suitable charges of silica; alumina; and an alkai metal (including ammonium) or alkaline earth metal oxide, fluoride, or hydroxide or mixtures thereof. The mixture thus formed is brought to a temperature within the range that I have determined to be suitable, and as this range lies far above the normal boiling point of water, I enclose the mixture in a pressure vessel so that the water will remain in the liquid state by autoclave action, and I maintain the mixture at the selected temperature for a long enough period of time for the desired mineral to form. When this has taken place the reaction mixture is allowed to cool, and the silicate mineral thus formed is recovered by any suitable process, such as decantation, centrifuging, or most conveniently, filtration. The recovered mineral may be washed as desired, and for various specific uses it may be given further treatment, all as set forth in an exemplary fashion hereinbelow.

The silica may be introduced in any convenient reactive form, but preferably one having a high surface area, so as to shorten the reaction time. For example, silica gel as obtained from sodium silicate solutions by removing alkali metal ions by any desired means is quite suitable. Also suitable is diatomite, especially when reasonably free of iron and other impurities. The silica may be in the form of submicron size silica as obtained by fuming silicon tetrachloride; several such products are commercially available. Similarly, the alumina is preferred in a high surface area form. Thus, alumina gel may be precipitated from sodium aluminate substances by acidification followed by washing. Alternatively, alumina may be prepared by hydrolysis of aluminum isopropoxide and analogous compounds. Alumina in naturally occurring mineral form is potentially usable, although it is difficult to obtain such material in a reasonably pure form. Commerically available trihydrate of alumina, gibbsite, or bayerite, is suitable as a source of alumina. It is convenient to prepare a mixed silica-alumina gel in the selected proportion and use this for further processing, as will appear in one of the examples given hereinbelow. The alkali metal oxide, fluoride or hydroxide or mixtures thereof, may be incorporated by using the corresponding commercial available compound.

As an aid to understanding the mode of operation of my invention, I give below a working example which at the same time shows the best mode of carrying out the invention of which I am aware:

EXAMPLE 1

41 lbs. of sodium silicate solution, assaying 8.9% $Na_2O$ and having an $Na_2O:SiO_2$ ratio of 1:3.3, were dissolved in water and passed through a polystyrene sulfonic acid ion-exchange resin in the hydrogen form, so as to remove the sodium. The effluent from this treatment was a polysilicic acid sol having a pH of approximately 3. Into this effluent, which contained 10.67 lbs. of $SiO_2$, were dissolved 28.6 lbs. of $AlCl_3 \cdot 6H_2O$, and 46.5 lbs. of 28% aqueous ammonia were added with stirring. The pH rose to 10, and both the silica and alumina were brought down in the form of a gel, which was filtered and washed. The wet filter cake contained 10.25% solids, and was used as such in the further processing.

1400 grams of the gel just described were washed twice with distilled water and made up to a final volume of 1.5 liters using distilled water. 8.8 grams of sodium hydroxide were then dissolved in this reaction mixture which was placed in an autoclave provided with a stirrer. The temperature was then raised to 285° C. and maintained at that point for 48 hours. The pressure was that corresponding to the vapor pressure of water, viz., 1000 p.s.i.a. The autoclave was allowed to cool, and the product removed and washed again with distilled water, and allowed to dry at room temperature to equilibrium with 50% relative humidity. The product resulting was a layer-lattice silicate mineral having the following approximate formula:

2.54 $SiO_2:Al_2O_3:0.52\ NaO_{1/2}:2.7\ H_2O$

The product had a base exchange capacity of 197 milliequivalents per 100 grams of dry product, and exhibited a $d_{001}$ spacing of 10.7 A. (at 50% relative humidity). By considerations of X-ray diffraction data on the product obtained, well-known in this art and reviewed in Chapter 11 of the book, "The X-Ray Identification and Crystal Structures of Clay Minerals," by G. Brown (Ed.), London, 1961, an interstratified structure of randomly alternating mica-like and montmorillonite-like layers was found to be present. Moreover, by the method discussed below, the approximate percentage of mica-like layers was found to be 70%. This material was useful as such for a wide scope of usages, including an insecticide carrier, an oil well drilling mud additive, a desiccant, and the like. However, it was especially adapted as a hydrocarbon cracking catalyst, particularly after the further treatment set forth in Example 2 which follows:

EXAMPLE 2

The product of Example 1 was redispersed in strongly ammoniacal water and again filtered, with the ammonium hydroxide treatment being carried through two cycles. Use of solutions of ammonium acetate or other ammonium salts in this step will also accomplish the desired result. The final filter cake was then redispersed in water, to form a slurry. A portion of this slurry was filtered, and the dry cake ground to pass 30 mesh. The remainder of the product was pray-dried to micro-spheroids, of median particle size of about 35 microns. Both dry products were heated to 500° C. for one hour. This treatment decomposed to ammonium ion to leave the products in hydrogen form. They were highly useful as hydrocarbon cracking catalysts.

Generally speaking, the synthesized silicate minerals which I make in accordance with my invention have the empirical formula:

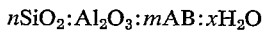

$$nSiO_2 : Al_2O_3 : mAB : xH_2O$$

where the layer lattices comprise said silica, said alumina, and said B, and where $n$ is from 2.4 to 3.0,
$m$ is from 0.2 to 0.6, A is an exchangeable cation such as $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, this component representing total water, interlamellar plus structural, as determined by ignition loss at 1000° C., said mineral being characterized by a $d_{001}$ spacing of at least 10.4 A. but not more than 14.7 A., determined at 50% relative humidity.

In accordance with the terminology in this art, by "external to the lattice" is meant, ions which are not within the individual sheet units of silica tetrahedra and alumina octahedra, but occur between such sheets and around their edges.

Crystal structure determinations have shown that the inventive silicate minerals represent a mixed layer structure with randomly alternating layers of montmorillonite-like and mica-like clay mineral with the proportion of mica-like layers ranging from about one-sixth to about five-sixth of the total.

In order to produce the inventive minerals, in accordance with the characterization just given, I have found that it is necessary to start with the constituents present in a somewhat different proportion from that occurring in the resulting product. Specifically, the silica/alumina ratio should be within the range 2.7 to 3.3. I have found that there is a more or less constant drop in this ratio of about 0.3 unit in going from the reaction mixture to the reaction product. Evidently, not all of the silica enters into the synthetic mineral but remains in solution and is discarded when the mineral is collected, as by filtration or otherwise.

I have found that the temperature at which formation of the inventive minerals takes place is within the practical range of 280° C. to 315° C., about 285° being optimum. I have moreover found that the pressure need not be appreciably in excess of the autoclave pressure of the mixture, i.e., that developed by the vapor pressure of the water itself. The latter is only negligibly changed by the dissolved material in the reaction mixture, since the bulk of the solids therein is not in a form which appreciably changes the vapor pressure. Hence, the ordinary tabulations of steam pressure may be used. Thus, at 285° C. the pressure developed is 1000 p.s.i. absolute.

The pH of the reaction mixture initially, as measured at room temperature, may vary over a wide range. Generally speaking, the pH will be primarily determined by the constituents entering into the reaction mixture, without substantial adjustment being especially necessary. Thus, where ammonium fluoride is used for the "AB" constituents in the characterization of the product given hereinabove, the pH will be relatively low and may be as low as 6.5 to 7. When, on the other hand, AB is furnished by a caustic alkali, such as sodium hydroxide or lithium hydroxide, then the pH will be relatively high, e.g., 10 or even higher.

The reaction time for optimum results will vary somewhat with the reaction mixture used, and to a considerably greater extent with the temperature of the reaction. I have found that two days at the optimum temperature of 285° C. gives good results. If the reaction time is greatly reduced, then the yield will be low, since a relatively large proportion of the reaction mixture will remain unreacted. If reaction times are prolonged unduly, e.g., for 1 or 2 weeks, then extreme crystallization sets in and the inventive materials are no longer obtained. As is well known in chemical kinetics, higher reaction temperatures require shorter reaction times, so that at 280° C., about three days will be generally found optimum, while at 315° C. the optimum reaction time may be as short as one-half day.

I have formulated a relatively simple experimental criterion for determining when the randomly interstratified mixture of the two species already described within the range of relative proportions, also described, has been achieved. This criterion is based upon the circumstances that the mica-like $d_{001}$ spacing is about 10.0 A., while that of montmorillonite is about 12.4 A., in the case where the exchangeable cation on the montmorillonite is monovalent. If this exchangeable cation is divalent, then the montmorillonite spacing will be 15.6 A. Furthermore, it should be noted that the 10.0 A. spacing just mentioned is substantially invariant with relative humidity, but the corresponding $d_{001}$ for montmorillonite varies in well known fashion with the number of water layers present. Thus, in accordance with known practice, $d_{001}$ spacings are determined with the samples in equilibrium with 50% relative humidity at room temperature, unless other stated.

Now, if both these constituents are present, although in completely segregated fashion, for example as would be obtained by mechanical mixing, then both of these peaks will be obtained upon X-ray diffraction investigation. In the case of the inventive silicate minerals, instead of having two separate peaks representing respectively the mica-like and montmorillonite-like components, a single broad peak is observed, intermediate between 10.0 A. and 12.4 A., for the case of monovalent exchangeable cations, and intermediate between 10.0 A. and 15.6 A. if the exchangeable cations are divalent. I have found that the useful range is between about 10.4 A. and 12.0 A. for the monovalent case and between about 10.4 A. and 14.7 A. for the divalent case with intermediate values for the case of both mono- and divalent cations being present, and this is the experimental criterion referred to. It is of interest that a simple consideration of additivity relationships leads to the following practical formulas for describing what may be termed the percentage of interstratified mica-like layers, as follows:

Monovalent: $\frac{12.4 - d_{001}}{2.4} \times 100$

= Percent interstratified mica-like layers

Divalent: $\frac{15.6 - d_{001}}{5.6} \times 100$

= Percent interstratified mica-like layers

In the above formula, the $d_{001}$ is the value of A. units actually obtained by X-ray diffraction for the sample under consideration, and will lie between 10.0 and 12.4 A., for the first case, or between 10.0 A. and 15.6 A. for the second case. The technique of carrying out such a determination is well-known in the clay mineralogy art and is set forth, for example, in Chapters 1, 4, 5 and 11 of the Brown book cited hereinabove.

Thus, my useful synthetic silicate minerals are obtained when the proportion of interstratified mica layers as determined by the method just set forth is within the approximate range of one-sixth to five-sixths, which corresponds to the $d_{001}$ range recited hereinabove for the useful range.

Investigations, mostly by X-ray diffraction methods, on many samples of silicate minerals, prepared in accordance with the general instructions already given and meeting the criteria just set forth, have suggested that the inventive materials exhibit the following characteristics: (a) Upon glycerol solvation, a broadening of the (001) diffraction maximum occurs. The technique of glyercol solvation, described in Chapters 4 and 11 of the book by Brown cited earlier in this writing, is useful for distinguishing between swelling and non-swelling components of a mixture. That is, treatment of a mica-like material with glycerol will not result in swelling and the $d_{001}$ will remain at about 10.0 A. If a montmorillonite-like component, on the other hand, is treated with glycerol, swelling will occur and the $d_{001}$ of the clay-organic complex will expand to about 17.7 A. For an interstratified mixture of mica-like and montmorillonite-like components, the result of glycerol solvation will be a swelling of the montmorillonite-like component within the interstratified structure. This effect will cause, in turn, a broadening of the diffraction maximum, and a shift toward a somewhat higher spacing. (b) Further, these mica-like and montmorillonite-like components are present, not as segregated aggregates of the two, but as already mentioned, as randomly alternating, mixed layer minerals. (c) Finally, some weak $h$-$k$-$l$ reflections are exhibited upon X-ray diffraction. It may be noted that the appearance of these $h$-$k$-$l$ reflections is apparently related to limited order in three dimensions. In setting forth these additional structural characteristics, however, it is to be understood that I do not wish to be bound thereby, but offer them merely as an aid in visualization of the inventive materials.

The drawings show tracings of the X-ray diffraction patterns of the product obtained in accordance with Example 1 hereinabove. Thus, this product had all monovalent exchangeable cations. FIGURE 1 shows the tracing for the non-oriented specimen, and FIGURE 2 that for the same material, oriented by the fashion common in this art, and set forth for example on page 18 of the Brown book cited, by allowing a thin layer of an aqueous suspension of the material to dry out on a flat, horizontal surface. FIGURE 3 shows the same material, again oriented, but treated with glycerol. This method likewise is set forth by the Brown book on page 34.

In these drawings, the 001 peak is clearly noticeable at about 10.7 A., and this same peak predominates in FIGURE 2, because of the orientation whereby the essentially flaky particles are aligned to a great extent with the 001 planes co-planar. The failure of glycerol treatment to bring about any shift in the position of the 001 peak is fully apparent from the curve of FIGURE 3, and as has been explained above, this is diagnostic for the products in accordance with the present invention.

The X-ray diffraction tests were carried out with copper K $\alpha$ radiation as is common in this art.

EXAMPLE 3

80 grams of diatomite (practically pure silica) were added to 2 liters of distilled water, and 192.8 grams $AlCl_3 \cdot 6H_2O$ were dissolved in this mixture. With stirring, aqueous ammonia was added until the system became strongly basic. The mixture was then filtered and washed through 3 cycles and finally redispersed to a total volume of 2 liters. 6.40 grams of NaOH, dissolved in a minimum amount of water, were added to the slurry; and this reaction mixture then heated at 285° C. and 1000 p.s.i. for 2 days. The product slurry was filtered and washed.

EXAMPLE 4

The product of Example 3 was redispersed in strongly ammoniacal water and again filtered. This operation was carried through two cycles. The final filter cake was dried at 105° C.

The combined products of several such syntheses were ground through a laboratory hammer mill to yield $-16$ mesh material, and a portion was then acid-washed (to reduce the iron content) at 95° C. for ½ hour using 10% HCl. The acid was used in large excess, and the treatment required three batches. The acid-washed product was washed with water and finally with aqueous ammonia. Subsequent study showed the presence of some $NH_4Cl$, as a residual impurity.

The dried material was ground by successive passes through a laboratory swing-hammer mill using a coarse screen, and $-200$ mesh material removed after each pass.

Analyses of the product gave the following results:

| Wet Chemical Analysis | "As-is" | Ignited |
|---|---|---|
| Ignition Loss, Percent | 15.23 | |
| $SiO_2$, Percent | 47.57 | 56.2 |
| $Al_2O_3$, Percent | 27.53 | 32.5 |
| $Fe_2O_3$, Percent | 1.35 | 1.6 |

Cation Exchange Results: Exchangeable cations: $NH_4^+$ and $H^+$.

Cation Exchange Capacity: 85.1 meq./100 gms. of clay.

EXAMPLE 5

61.5 lbs. of sodium silicate gel, as described in Example 1, were dissolved in 60 gallons of distilled water, heated to 150° F. and passed through a bed of polystyrene sulfonic acid ion exchange resin in a hydrogen form, in order to prepare a polysilicic acid sol. The pH of the effluent was kept below a value of 3. To this sol were added 45 lbs. of $AlCl_3 \cdot 6H_2O$. When solution of this aluminum salt had been achieved, 40 lbs. of 28% aqueous ammonia were added in order to precipitate the silica and the alumina. At the end of this treatment, the pH had increased to 8.5. This co-precipitated gel was filtered and the filter cake repulped in distilled water and again filtered. This washing procedure continued through five cycles and resulted in a final $Cl^-$ content of 0.2%. This final filter cake was dispersed in distilled water to a total volume of 60 gallons. No additional alkali was added beyond the ammonia remaining from the precipitation step. This final dispersion was then autoclaved at 545° F. and 985 p.s.i.g. for 44 hours. The time required to bring this volume of slurry to temperature was 11 hours and the reaction product was allowed to cool for 35 hours before any further treatment. The product was removed from the autoclave, filtered and washed twice with dilute aqua ammonia and the washed filter cake dried at 210° overnight. Investigation of the cation exchange capacity of the product gave the following results:

Cation exchange capacity (total)—148.3 meq. per 100 gms. dry product.
Exchangeable $Ca^{++}$ present—2.3 meq. per 100 gms. dry product.
Exchangeable $Na^+$ present—2.0 meq. per 100 gms. dry product.
Exchangeable $NH_4^+$ present—144.8 meq. per 100 gms. dry product.
No $Mg^{++}$ was detected.

EXAMPLE 6

31.6 grams of kaolinite, 18.8 grams acid-washed diatomite and 1.82 grams of NaOH were mixed together in one liter of distilled water. The resultant slurry was placed in an autoclave and then treated hydrothermally at 300° C. for 5 days. The pH of the product slurry was approximately 6. This slurry was filtered and washed twice by re-slurrying in dilute aqueous ammonia and then washed twice with water, also by this re-slurrying technique. The final filter cake was dried at 105° C.

EXAMPLE 7

152 lbs. of sodium silicate solution as described in Example 1 were dissolved in 85 gallons of distilled water and converted to a polysilicic acid sol by an ion exchange procedure described in Examples 1 and 5. 40.7 lbs. of trihydrate of alumina, assaying 64.9% $Al_2O_3$, were added to the silica sol and to this mixture was further added 3.48 lbs. of $NH_4F$ and 0.30 lb. $NH_4OH$. The final pH prior to treatment was 8.5. This slurry was heated at 285° C. and 985 p.s.i.g. for 44 hours. The time required to reach this temperature was 11 hours. The autoclave charge was cooled with the aid of cooling coils over a four-hour period. The product was then recovered by filtration, washed, and dried in a tray drier at 98° C. overnight.

EXAMPLES 8 and 9

The products of Examples 5 and 7, respectively, were calcined at 500° C. for one hour to produce in each instance the corresponding hydrogen clay-like mineral.

EXAMPLE 10

The oven-dried material from Example 6 was ground to 30–60 mesh and a portion of the granular product was heated to 700° C. for 2 hours and then cooled in air. This calcined product was placed in a small beaker, sufficient 1 N HCl added to make a slurry that was easily stirred, the mixture brought to boiling on a hot plate, removed and the HCl solution decanted once the granular material had settled to the bottom of the beaker. This cycle was repeated 3 times. The sample was then washed twice with distilled water and dried at 105° C.

A catalytic evaluation of various of the several synthetic materials produced as set forth above was conducted by means of a microcatalytic technique described in a Gulf Research and Development Company article entitled, "A Semi-Automatic Microreactor for Catalytic Research," by Hall, McIver and Weber, in Ind. and Eng. Chem., 52, 421 (1960).

This microcatalytic technique yields the following experimental results: percent conversion of 2,3-dimethylbutane to products, catalyst sample weight contained in a fixed volume, and the apparent activation energy in kilocalories per mol for the cracking of 2,3-dimethylbutane. The percent conversion together with the sample weight and surface area in square meters per gram of catalyst (determined by the well known Brunauer-Emmett-Teller technique, using nitrogen as the adsorbate), can then be converted to a number which is related to the activity of a unit area of catalyst surface. This derived parameter is known as the specific activity and is obtained by dividing the percent conversion by the product of the surface area and sample weight, and then multiplying this result by the arbitrary factor of 100.

Because the percent conversion is definitely temperature dependent, a standard reaction temperature of 525° C. is employed in order that the cracking properties of catalysts may be properly compared. Where the percent conversion is reported as greater than 100%, this is an extrapolated value and simply means that 100% conversion actually occurred at temperature lower than 525° C.

Table I below lists the several cracking catalysts produced in the above samples and the several parameters obtained by the described microcatalytic technique. Included in this table are corresponding values obtained with three different commercial cracking catalysts. Sample "A" is a conventional silica-alumina catalyst; Sample "B" is a high-alumina form of commercial catalyst "C"; and Sample "C" is a "natural" halloysite clay catalyst.

*Table I*

| Product from Example No. | Percent Conversion, 525° C. | Specific Activity | Surface Area, m.²/gm. | Activation Energy, kcal./mol |
|---|---|---|---|---|
| 2 | 75 | 21.1 | 120 | 18 |
| 4 | 101 | 15.5 | 99 | 18 |
| 8 | 171 | 31.8 | 91 | 24 |
| 9 | 82 | 15.3 | 94 | 19 |
| 10 | 49 | 30.6 | 129 | 20 |
| A | 70 | 5.4 | 425 | 21 |
| B | 41 | 5.2 | 163 | 18 |
| C | 51 | 8.4 | 115 | 18 |

As will be evident from this table, the catalysts in accordance with this invention generally produce higher percent conversions and have much higher specific activities than any of the commercial catalysts listed.

EXAMPLE 11

The product made in accordance with Example 1 was dispersed by adding 129 g. of the material to 4000 ml. of water heated to 70° C. The resulting slurry was agitated with a "Lightnin" mixer at 600 r.p.m. for 30 minutes. After this initial agitation 76.7 g. of dimethyl-dihydrogenated tallow ammonium chloride was introduced and the slurry further agitated for 15 minutes, maintaining the original temperature. The resulting product was filtered using a No. 5 Büchner funnel and a medium texture filter paper. The filtration rate was observed to be very slow. The filter cake was dried in a blower oven at 70° C. for 8 hours and ground in a hammer mill using an 0.024 inch perforated screen.

Using the product thus prepared, a 10% grease was made using a coastal stock oil ("Conoco 400"), by simple mixing and heating. Acetone at a concentration of 4% was used as the dispersion aid, as is common in the organophilic bentonite grease art. Test data for the grease are shown below:

Milliequivalents [1] _____ 99.42
Percent moisture _____ 0.80
ASTM penetration, mm.×10:
   60× _____ 368
   10,000× _____ 365

[1] Milliequivalents of organic ammonium cation per 100 grams of the clay-like material.

It will be seen that a good grease was prepared, having among other characteristics a good retention of penetration upon working, in accordance with the applicable test method of the American Society for Testing Materials.

EXAMPLE 12

A quantity of the product prepared in accordance with Example 1 was made into an oil-well drilling mud by dispersing it in water, using a high-speed laboratory stirrer as is common in this art. Two muds were prepared, of 50 and 55 pounds of product per barrel (42 U.S. gallons) of drilling mud, with pH adjustment to 8.0–8.1 using normal caustic soda, and these were tested in accordance with the method set forth in the applicable testing procedures prescribed by the American Petroleum Institute in Code 29 thereof, with the following results:

calcined at 500° C., although without the acid-wash as described, for example, in Example 4, and the hydrocarbon cracking characteristics investigated. All of these results are set forth in the summary table which follows:

Table II

| Synthesis Time, days | CEC,* meq./100 gm.[6] | S.A.,** m.²/gm. | Intensity (06) rel. to arbitrary standard | $d_{001}$, oriented, A. | | Bulk Density, 30/60 gm./cc. | Percent Conv. of DMB, 525° C. | Specific Activity, 525° C. |
|---|---|---|---|---|---|---|---|---|
| | | | | 50% relative humidity | Glycerol-solvated | | | |
| 0.5 | 71.64 | 133 | 0.40 | [1] 11.7 | No data | 0.47 | [5] 10.1 | |
| 1 | 90.46 | 80 | 0.84 | 11.9 | 17.0 | 0.44 | 45.8 | 8.7 |
| 1.5 | 110.67 | 83 | 1.13 | 11.8 | [2] 17.3 | 0.93 | 67 | 12.4 |
| 2 | 91.28 | 77 | 1.08 | 11.8 | [3] 16.7 | 0.99 | 30 | 5.6 |
| 3 | 81.92 | 62 | 1.13 | 11.8 | [4] 17.7 9.2 | 0.93 | [5] 10.2 | |

*Cation exchange capacity.
**Surface area.
[1] (001) very broad and of low intensity.
[2] High angle shoulder centering at 9.95 A.
[3] High angle shoulder centering at about 10.2 A.
[4] Basal divides into two distinct peaks at 17.7 and 9.2, indicative of a physical mixture of mica-like and montmorillonite-like components.
[5] Thermal cracking only.
[6] Dry basis (equilibrium at 105° C.).

| Conc., lb./bbl | 50.0 | 55.0 |
|---|---|---|
| Stormer Viscosity, cp | 10 | 16 |
| Stormer In. Gel, g | 0 | 0 |
| Stormer 10-Min. Gel, g | 0 | 0 |
| pH | 8.1 | 8.0 |
| Fann, Plastic Viscosity, cp | 8.5 | 9.5 |
| Fann, Yield Point, lb./100 sq. ft | 4.5 | 16.0 |
| Filtrate, API, cc | 16.0 | 14.8 |
| Cake, 32nd of inch | 3 | 3 |

From the above results, it may be calculated that the product had a yield of 39 to 50 barrels of 15 centipoise mud per ton of dry product. The material may be seen from the test results to be suitable for preparing drilling mud for well-drilling operations in general.

EXAMPLE 13

The product of Example 1 was ground to 4–8 mesh, and heated at 175° C. to equilibrium weight. It was then cooled, and placed in a one-inch diameter tube, and air saturated with water at the ambient temperature, 25° C., passed through at a rate of 0.134 cubic feet per minute. The air flow was continued for 3 hours during which time the dewpoint of the effluent air dropped to −23° C. corresponding to a total dewpoint depression of 48° C., and then increased gradually to +20° C.; at this point the air flow was stopped and the weight increase of the desiccant determined. Air saturated with water at 25° C. contains approximately 0.65 gms. $H_2O$/cu. ft., and, at the air flow used, approximately 16 gms. $H_2O$ passed through the desiccant. The desiccant (67 gms. dry weight) absorbed 8.8 gms. of this water, corresponding to a dehydration capacity (based on weight of dry desiccant) of 13.1%. This product is accordingly well-suited as a desiccant.

As mentioned earlier, for a particular reaction mixture and a particular temperature selected within the range already set forth, there will be an optimum reaction time at that temperature which will give the best product in accordance with the invention. By "best product" I mean of course a product which exhibits to the greatest extent the characteristics already set forth, and recited in the claims. An example is provided in a series of runs made at different reaction times, in which the reaction mixture was that already set forth in Example 3 hereinabove, but a reaction temperature of 300° C. The series comprised five runs at reaction times as short as ½ day and as long as 3 days. The cation exchange capacity was determined for the product resulting from each of the runs, and the series of products were in addition investigated by the X-ray diffraction methods already mentioned, to determine the nature of the 001 peak. Finally, the products were calcined at 500° C., although without the acid-wash as described, for example, in Example 4, and the hydrocarbon cracking characteristics investigated. All of these results are set forth in the summary table which follows:

The following conclusions and remarks may be made concerning the results shown in Table II:

(a) Low intensity of (001) for 0.5 day sample is due to the presence of a small amount of crystalline material in the presence of a relatively large amount of amorphous material (relative intensity of (06) is 0.40 for 0.5 day; equilibrium value is about 1.13).

(b) The product crystallizing initially is in this case predominantly montmorillonite-like platelets interstratified with a lesser amount of mica-like layers. This arrangement seems essentially constant until the equilibrium amount of crystalline material is obtained (note behavior of intensity of (06)). Beyond this point, the total amount of crystalline material remains constant (note constancy of rel. intensity of (06) over the range 1.5–3 days), but there is an increasing tendency for the interstratified material to separate into a mixture of two separate phases. This change appears as shouldering of the (001) in the glycerol-treated 1.5 and 2 days samples. Finally this (001) separates into two distinct peaks in the case of the glycerol-solvated 3 day sample, the spacing of one peak being characteristic of a montmorillonite-glycerol complex while the spacing of the other peak is more characteristic of the micas.

(c) The optimum for catalytic activity apparently occurs at the point where the maximum yield of the interstratified product is obtained.

(d) Surface area, in general, decreases as a function of synthesis time at this temperature. The surface area of a 0 day sample (i.e., unreacted mixture) was 66.7 m.²/gm., however, so that an initial increase in area occured.

(e) Cation exchange capacity also goes through a maximum as a function of synthesis time. The maximum CEC occurs for the sample which also gives the maximum cracking activity. It should be remembered that all these data apply specifically to a particular mixture of reactants and operating conditions only. It does not necessarily follow that a change in the reactants or in process conditions will result in the same general behavior; i.e., existence of optima at some temperature-dependent reaction time. It is probable, however, that parallel results would be obtained. These results will however be useful to those desiring to practice the invention.

It is instructive to note that this entire series just detailed is somewhat near the borderline of the inventively useful range. Thus, the temperature of 300° C. is somewhat less favorable than that of 285° C., frequently used in other examples given herein. In keeping with this nature of this series, it may be noted that the best DMB conversion and specific activity obtained were respectively 67% and 12.4, and while these are good values, they are not as high as those achieved in other runs under more favorable conditions as reported in Table I hereinabove.

While the invention has been described with the aid of various illustrative specific examples, it will be apparent from the disclosures generally and the nature of the invention itself that numerous modifications, variations, and substitutions may be made in the ingredients, the apparatus used, the conditions employed, various details of procedure, and the like. Accordingly, I desire it to be understood that, within the broad scope of the appended claims, the invention may be practiced otherwise than has been specifically described in the illustrative examples.

Having described the invention, I claim:

1. A layer-type clay-like mineral having the empirical formula:

$$n\mathrm{SiO}_2 : \mathrm{Al}_2\mathrm{O}_3 : m\mathrm{AB} : x\mathrm{H}_2\mathrm{O}$$

where the layer lattices comprise said silica, said alumina, and said B, and where $n$ is from 2.4 to 3.0,
$m$ is from 0.2 to 0.6,
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations.

2. A mineral in accordance with claim 1 in which A is chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$ and $\frac{1}{2}Ba^{++}$ and mixtures thereof.

3. A mineral in accordance with claim 1 in which said $d_{001}$ is about 10.7 A.

4. A mineral in accordance with claim 1 in which $n$ is about 2.5, $m$ is about 0.52, $x$ is about 2.7, A is $Na^+$, B is $\frac{1}{2}O^{--}$, and said $d_{001}$ spacing is about 10.7 A.

5. A mineral in accordance with claim 1 in which $n$ is about 2.5, $m$ is about 0.52, $x$ is about 2.7, A is $NH_4^+$, B is $\frac{1}{2}O^{--}$, and said $d_{001}$ spacing is about 10.7 A.

6. A mineral adaptable to be converted into the hydrogen form of said mineral upon calcination consisting essentially of the product of claim 1, in which A is predominantly $NH_4^+$.

7. A mineral adaptable to be converted into the hydrogen form of said mineral upon calcination consisting essentially of the product of claim 1 in which $n$ is about 2.5, $m$ is about 0.52, $x$ is about 2.7, A is $NH_4^+$, B is $\frac{1}{2}O^{--}$, and said $d_{001}$ spacing is about 10.7 A.

8. A reaction mixture adaptable to forming a novel synthetic layer-like clay mineral upon autoclaving at a temperature within the range of 280° to 315° C. consisting essentially of:
water;
a minor proportion of alumina;
silica in the molar ratio to said alumina of 2.7 to 3.3; and
a cation chosen from the group consisting of ammonium, sodium, lithium, potassium, calcium, barium and strontium and mixtures thereof, together with an equivalent amount of an anion chosen from the group consisting of hydroxyl and fluoride and mixtures thereof, said anion being present in the molar ratio to said alumina of 0.2 to 0.6.

9. The mixture in accordance with claim 8 in which said cation is sodium and said anion is hydroxyl.

10. The mixture in accordance with claim 8 in which said cation is $NH_4^+$.

References Cited by the Examiner

UNITED STATES PATENTS 2,882,244   4/1959   Milton _____ 23—112

OTHER REFERENCES

Barrer et al.: "Jr. Chemical Society," 1952, pages 1561–1571.

OSCAR R. VERTIZ, *Primary Examiner.*

TOBIAS E. LEVOW, *Examiner.*

J. POER, E. J. MEROS, *Assistant Examiners.*